(12) United States Patent
Iwata et al.

(10) Patent No.: US 9,555,537 B2
(45) Date of Patent: Jan. 31, 2017

(54) PORTABLE TOOL

(71) Applicant: HITACHI KOKI CO., LTD., Tokyo (JP)

(72) Inventors: Kazutaka Iwata, Hitachinaka (JP); Yasutaka Shimizu, Hitachinaka (JP); Shogo Shibata, Hitachinaka (JP)

(73) Assignee: HITACHI KOKI CO., LTD., Tokyo (JP)

( * ) Notice: Subject to any disclaimer, the term of this patent is extended or adjusted under 35 U.S.C. 154(b) by 614 days.

(21) Appl. No.: 14/069,017

(22) Filed: Oct. 31, 2013

(65) Prior Publication Data

US 2014/0116737 A1 May 1, 2014

(30) Foreign Application Priority Data

Oct. 31, 2012 (JP) .................................. 2012-239785

(51) Int. Cl.
*B25F 5/02* (2006.01)
*B25F 5/00* (2006.01)
(Continued)

(52) U.S. Cl.
CPC ............... *B25F 5/02* (2013.01); *B24B 23/005* (2013.01); *B25F 5/00* (2013.01); *B25F 5/001* (2013.01);
(Continued)

(58) Field of Classification Search
CPC ............... B25F 5/00; B25F 5/001; B25F 5/02; B25F 3/00; H01M 2/10; H01M 2/1022; B26B 21/222; B26B 21/4088; B26B 21/4056; H01H 9/06; A01G 3/053; A01G 3/06
(Continued)

(56) References Cited

U.S. PATENT DOCUMENTS 4,412,158 A * 10/1983 Jefferson ............... H02P 25/145
318/257
4,689,534 A * 8/1987 Gerber ..................... H01H 9/06
310/47
(Continued)

FOREIGN PATENT DOCUMENTS

JP          55-66712          5/1980
JP       2005-151794 A       6/2005
(Continued)

OTHER PUBLICATIONS

Notification of Reasons for Refusal Japanese Patent Application No. 2012-239785 dated Jul. 5, 2016 with English translation.
(Continued)

*Primary Examiner* — Scott A. Smith
(74) *Attorney, Agent, or Firm* — McDermott Will & Emery LLP (57) ABSTRACT

A casing of a hedge clipper which is a portable tool is provided with a power source housing in which an electric motor is housed and a main handle held by a worker, and blades serving as a tip tool are provided to the casing. An operation display panel is provided on the main handle, and a driving information display unit which displays a battery remaining capacity and a rotation speed of an electric motor as a plurality of pieces of driving information is provided on the operation display panel. The selection of the information to be displayed is switched by the operation of an operation switch unit provided in the operation display panel.

15 Claims, 4 Drawing Sheets

(51) Int. Cl.
  *B26B 21/40* (2006.01)
  *B24B 23/00* (2006.01)
  *H01H 9/06* (2006.01)
  *A01G 3/053* (2006.01)
  *A01G 3/06* (2006.01)

(52) U.S. Cl.
  CPC ........... *B26B 21/4056* (2013.01); *A01G 3/053* (2013.01); *A01G 3/06* (2013.01); *H01H 9/06* (2013.01)

(58) Field of Classification Search
  USPC ........ 173/20, 21, 170, 217, 171, 47; 30/228, 30/277.4, 312, DIG. 1, 165; 310/47, 50; 388/808, 937, 838; 408/16
  See application file for complete search history.

(56) References Cited

U.S. PATENT DOCUMENTS

| | | | | |
|---|---|---|---|---|
| 5,105,130 A * | 4/1992 | Barker | ............... | B23B 45/02 318/268 |
| 5,158,354 A * | 10/1992 | Simonin | ............... | B25B 21/00 173/164 |
| 5,445,479 A * | 8/1995 | Hillinger | ............... | B25F 5/00 16/430 |
| 5,563,482 A * | 10/1996 | Shaw | ............... | B25B 23/147 173/176 |
| 6,443,675 B1 * | 9/2002 | Kopras | ............... | B25F 5/02 144/136.95 |
| 6,536,536 B1 * | 3/2003 | Gass | ............... | B23B 31/123 173/171 |
| 6,962,523 B2 * | 11/2005 | Fraser | ............... | B23Q 11/005 451/259 |
| 7,274,866 B2 * | 9/2007 | Rudolf | ............... | B25F 5/00 173/217 |
| 7,282,818 B2 * | 10/2007 | Kovarik | ............... | B25F 5/00 307/117 |
| 7,649,337 B2 * | 1/2010 | Uehlein-Proctor | ....... | B25F 5/00 320/112 |
| 7,722,435 B2 * | 5/2010 | King | ............... | B24B 23/00 451/354 |
| 7,882,900 B2 * | 2/2011 | Borinato | ............... | B23B 45/008 173/176 |
| 2006/0220612 A1 * | 10/2006 | Feldmann | ............... | B25F 5/022 320/114 |
| 2009/0013477 A1 * | 1/2009 | Agronin | ............... | B25B 7/00 7/107 |
| 2009/0071008 A1 * | 3/2009 | Hart | ............... | B26B 21/222 30/34.05 |
| 2010/0218386 A1 * | 9/2010 | Ro kamp | ............... | A01G 3/053 30/277.4 |
| 2010/0218967 A1 * | 9/2010 | Ro kamp | ............... | A01G 3/053 173/217 |
| 2011/0314677 A1 * | 12/2011 | Meier | ............... | A46B 5/0062 30/41.8 |
| 2012/0031635 A1 * | 2/2012 | Svennung | ............... | B25F 5/00 173/20 |
| 2013/0314007 A1 | 11/2013 | Yanagihara et al. | | |
| 2014/0190713 A1 * | 7/2014 | Martinsson | ............... | B25F 5/02 173/20 |
| 2015/0289451 A1 * | 10/2015 | Koizumi | ............... | B25F 5/00 30/228 |

FOREIGN PATENT DOCUMENTS

| | | |
|---|---|---|
| JP | 2008-229763 | 10/2008 |
| JP | 2010-200673 A | 9/2010 |
| JP | 2010-201612 A | 9/2010 |
| JP | 2011-115919 A | 6/2011 |
| JP | 2012-011504 A | 1/2012 |
| JP | 2012-139801 A | 7/2012 |
| WO | 2012108415 A1 | 8/2012 |

OTHER PUBLICATIONS

Notification of Reasons for Refusal issued in corresponding Japanese Patent Application No. 2012-239785 dated Nov. 1, 2016, with English language translation.

* cited by examiner

PORTABLE TOOL

CROSS-REFERENCE TO RELATED APPLICATION

The present application claims priority from Japanese Patent Application No. 2012-239785 filed on Oct. 31, 2012, the content of which is hereby incorporated by reference into this application.

TECHNICAL FIELD OF THE INVENTION

The present invention relates to a portable tool provided with an operation display device which displays driving information of a portable tool in which a tip tool is driven by a driving source such as an electric motor like a hedge clipper or others.

BACKGROUND OF THE INVENTION

A portable tool in which a tip tool is driven by a power source such as an electric motor includes a hedge clipper, a round saw, a driver, an impact driver, a hammer, a hammer drill, a jigsaw, a grinder, a blower and others. The hedge clipper has a pair of blades as a tip tool and is used for pruning the branches and leaves of shrubs and trees, and it is also referred to as a hedge trimmer. The round saw has a disk saw blade as a tip tool and is used for cutting workpieces and milling grooves. The driver has a driver bit as a tip tool and is used for turning screws such as bolts and nuts. A type of driver which is designed to apply an impact force to a tip tool is referred to as an impact driver, an impact wrench or a hammer drill. The jigsaw has a reciprocating saw blade as a tip tool and is used for making a curve cut or a straight cut on a processed object. The grinder has a grind stone as a tip tool and is used for polishing and grinding workpieces. The blower is used for propelling air out of a nozzle to collect withered leaves and others.

A portable tool using an electric motor as a driving source and having a battery pack for supplying power to the electric motor is provided with an operation display panel for displaying driving information such as remaining capacity of the battery pack. In the case where a speed of an electric motor corresponding to a speed of a tip tool and the like other than the remaining capacity of the battery pack are displayed as driving information on an operation display unit, a switch operated when the remaining capacity of the battery pack is displayed by lighting on a capacity display unit and a switch operated when other information is displayed by lighting are separately provided on an operation display panel.

Japanese Patent Application Laid-Open Publication No. 2008-229763 describes portable tools such as a round saw, a hammer drill, and a jigsaw in which a tip tool is driven by power supplied from a battery pack. On an operation display panel unit of the round saw, a switch operated when a remaining capacity of a battery pack is displayed by lighting on a capacity display unit and a switch operated when life of a brush of an electric motor is displayed by lighting on a life display unit are separately provided.

As described above, when a plurality of switches for displaying mutually different functions are separately provided on an operation display panel unit of a portable tool, the operation display panel unit has to be enlarged. Further, when a plurality of display units for displaying mutually different functions are separately provided on an operation display panel unit, the operation display panel unit has to be enlarged.

If the operation display panel unit is enlarged, a worker is required to select and operate a specific switch from among a plurality of switches provided on a large operation panel unit for displaying a specific function, and a problem in operability arises. Further, since a control board on which the large operation display panel unit is attached also has to be enlarged, the number of component parts is increased, so that the portable tool is enlarged in size and the manufacturing cost thereof is increased.

An object of the present invention is to provide a portable tool capable of improving the operability thereof.

SUMMARY OF THE INVENTION

A portable tool of the present invention is a portable tool having a casing provided with a power source housing in which a power source is housed and a handle held by a worker, the portable tool includes: an operation display panel unit provided with a driving information display unit which displays a plurality of pieces of driving information and an operation switch unit which selects specific driving information from among the plurality of pieces of driving information displayed on the driving information display unit, and the single driving information display unit displays the plurality of pieces of driving information, and display contents of the driving information to be displayed thereon are switched by the single operation switch unit.

In the portable tool of the present invention, the display contents of the driving information to be displayed on the driving information display unit are switched in accordance with an operation status of the operation switch unit. In the portable tool of the present invention, an operation time of the operation switch unit is employed as the operation status of the operation switch unit, and display of the driving information is switched by the operation switch unit in accordance with the operation time. In the portable tool of the present invention, the number of operations of the operation switch unit is employed as the operation status of the operation switch unit, and display of the driving information is switched by the operation switch unit in accordance with the number of operations. The portable tool of the present invention further includes: an electric motor serving as the power source; and a battery which supplies power to the electric motor, and the driving information display unit displays a remaining capacity of the battery. The portable tool of the present invention further includes: an electric motor serving as the power source; and a battery which supplies power to the electric motor, and the driving information display unit displays a life of the battery.

The portable tool of the present invention further includes: an electric motor serving as the power source; and a battery which supplies power to the electric motor, and the driving information display unit displays a life of the electric motor. In the portable tool of the present invention, the driving information display unit displays a speed of a tip tool. In the portable tool of the present invention, the driving information display unit has a plurality of light emitting parts, and display contents of the driving information to be displayed on the driving information display unit are switched in accordance with the number of light emitting parts being lit on. In the portable tool of the present invention, the operation display panel unit is provided on an upper surface of the casing, and a worker can operate the operation switch unit while holding the handle. In the portable tool of the present invention, a part of the casing on which the operation display panel unit is provided is directed to the handle side.

A portable tool of the present invention is a portable tool having a casing provided with a power source housing in which a power source is housed and a handle held by a worker, the portable tool includes: an operation display panel unit provided with a driving information display unit which displays a plurality of pieces of driving information and an operation switch unit which selects specific driving information from among the plurality of pieces of driving information displayed on the driving information display unit, and display contents of the driving information to be displayed on the driving information display unit are switched in accordance with an operation status of the operation switch unit.

A portable tool of the present invention is a portable tool having a casing provided with a handle unit held by a worker and a power source housing which is located on a front side of the handle unit and houses a power source and a tip tool which is located on a front side relative to the power source housing and is driven by the power source, the portable tool includes: an operation display panel unit provided with a driving information display unit which displays driving information and/or an operation switch unit which selects driving information displayed on the driving information display unit, and the operation display panel unit is disposed at a position below a virtual line connecting top parts of the casing in a vertical direction. In the portable tool of the present invention, the operation display panel unit is provided on a front side of the casing relative to the handle unit. In the portable tool of the present invention, the casing has an inclined part which inclines upward as it goes from the handle unit to the power source housing, and the operation display panel unit is provided on the inclined part.

According to the present invention, an operation display panel provided on a casing of a portable tool has a driving information display unit and an operation switch unit, a plurality of pieces of driving information of the portable tool are displayed on the single driving information display unit, and specific driving information of the plurality of pieces of driving information is selected by an operation of the single operation switch unit. Therefore, the size of the operation display panel can be reduced without reducing the size of the driving information display unit and the operation switch unit. As a result, the operation of the operation switch unit can be facilitated, so that it is possible to improve the operability of the operation switch unit and also possible to make the driving information display unit more visible.

The present invention is applied to portable tools such as a hedge clipper, a round saw, a jigsaw, a grinder and others in which a tip tool is driven by a power source and a blower in which a driven member is driven. In the case where an electric motor driven by power from a battery is used as a power source, a speed of the electric motor and a remaining capacity of the battery are displayed on the driving information display unit.

DESCRIPTIONS OF THE PREFERRED EMBODIMENTS

Figure 1:
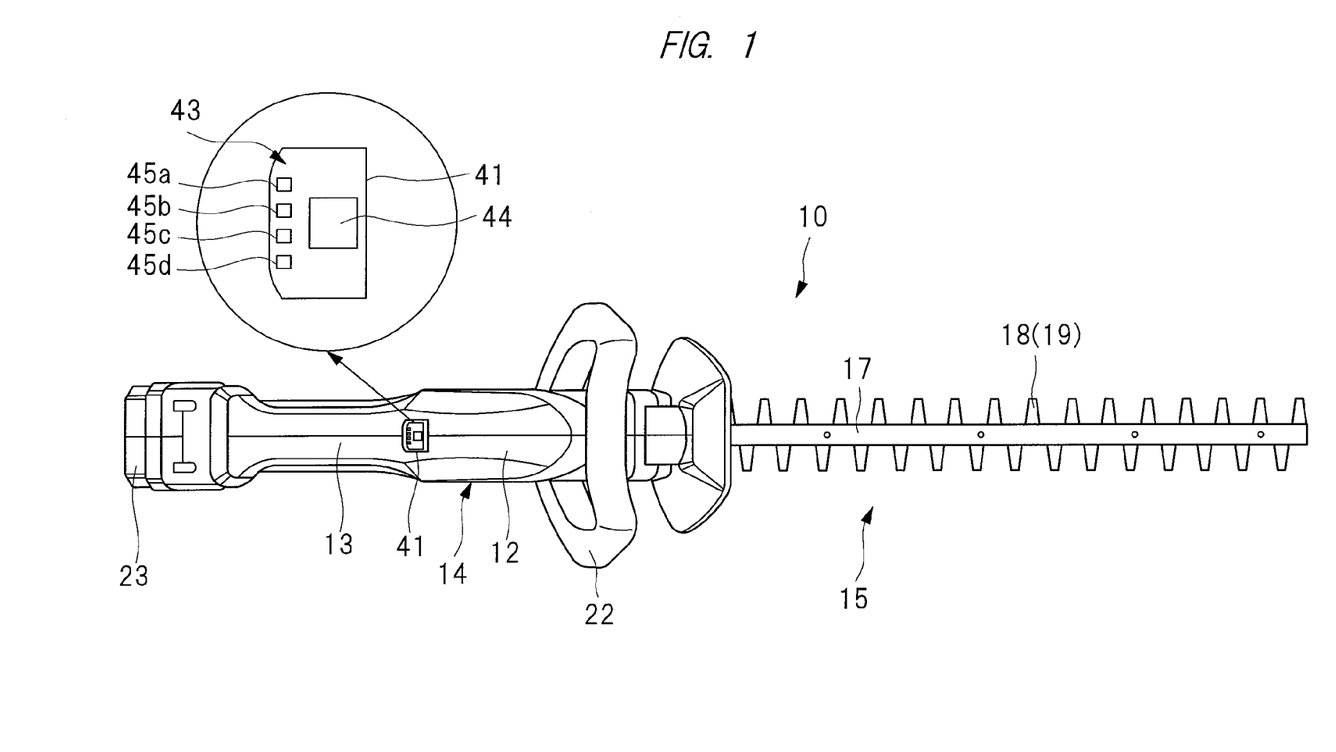
FIG. 1 is a plan view showing a hedge clipper serving as an example of a portable tool.
Figure 2:
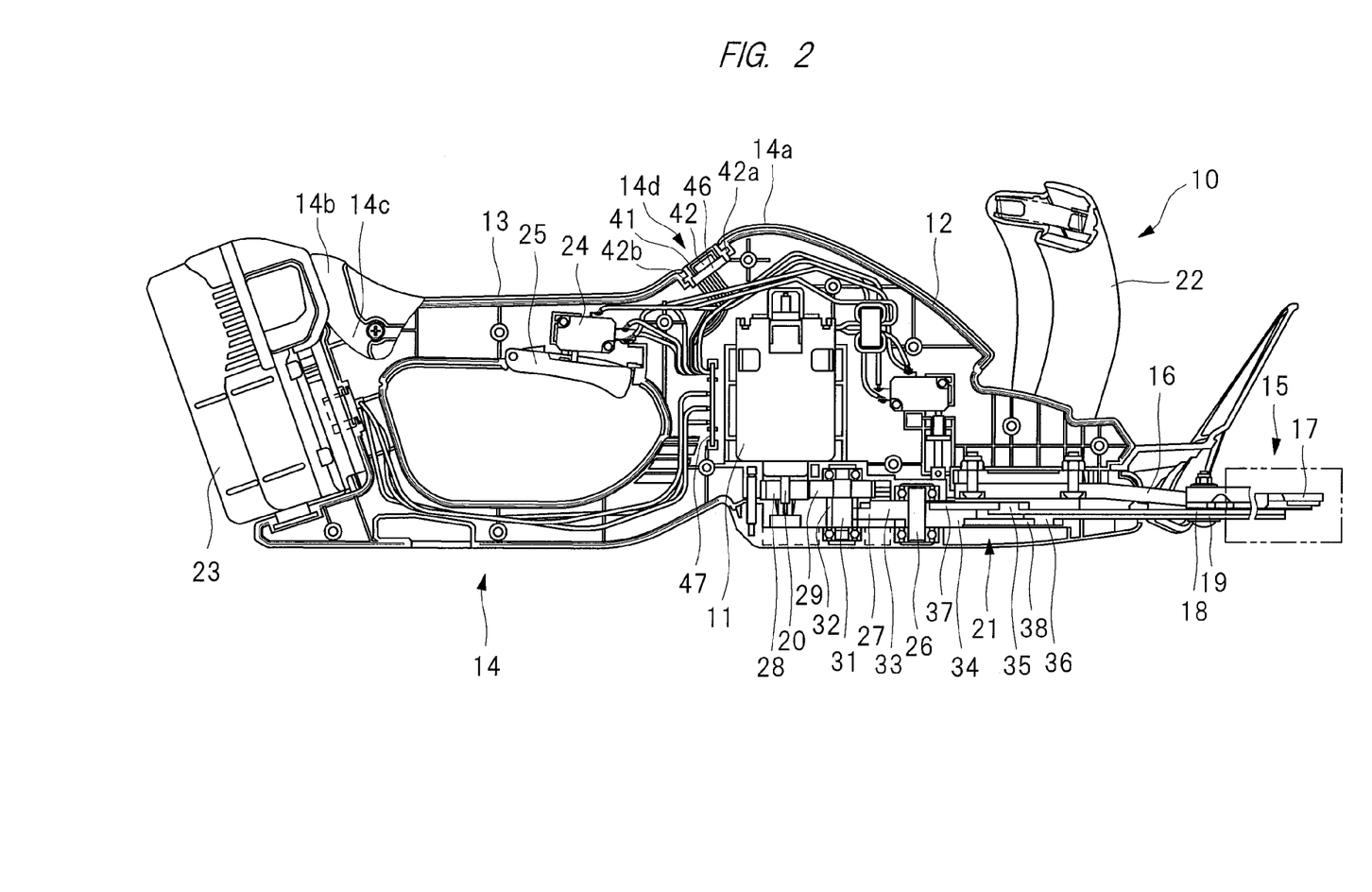
FIG. 2 is an enlarged longitudinal cross-sectional view of a casing shown in FIG. 1.

Hereinafter, an embodiment of the present invention will be described in detail with reference to the drawings. FIG. 1 and FIG. 2 show a hedge clipper serving as an example of a portable tool, that is, a hedge trimmer. The hedge clipper 10 has a portable-tool main body, that is, a casing 14 integrally made up of a power source housing 12 in which an electric motor 11 serving as a power source is housed and a main handle 13, and the casing 14 has the power source housing 12 and the main handle 13 on a rear side thereof. On a front end part of the casing 14, a blade assembly 15 as a tip tool is provided, and the blade assembly 15 projects forward from the front end part of the casing 14.

The blade assembly 15 has a guide bar 17 fixed to the casing 14 with a bracket 16. Two trimming blades each formed of a rod-like plate, that is, blades 18 and 19 are attached to the guide bar 17 so as to be reciprocated in a longitudinal direction. Rotational motion of an output shaft 20 of the electric motor 11 is reduced and converted by a power conversion mechanism 21 to linear reciprocating motion of the blades 18 and 19, and the blades 18 and 19 are driven by the electric motor 11.

A sub handle 22 is provided at the front end part of the casing 14. When a worker carries out the pruning work for working objects such as the branches and leaves of shrubs and trees, the worker operates the hedge clipper 10 while holding the main handle 13 by one hand and holding the sub handle 22 by the other hand.

A battery pack 23 in which a battery to supply power to the electric motor 11 is incorporated is detachably attached at a rear end part of the casing 14. A trigger switch 24 is incorporated in the main handle 13, and the trigger switch 24 is turned on/off by an operation lever, that is, a trigger 25 provided on the main handle 13. When the worker turns on the trigger 25, power is supplied to the electric motor 11, and the electric motor 11 is driven to rotate.

The power conversion mechanism 21 has a cam gear 27 attached to a support shaft 26 rotatably supported by the casing 14. In order to reduce the rotation of the output shaft 20 of the electric motor 11 and transmit it to the cam gear 27, a reducing gear 29 meshing with a pinion 28 fixed to the output shaft 20 is rotatably attached to the casing 14 by a support shaft 31. A pinion 32 attached to the support shaft 31 and rotating integrally with the reducing gear 29 meshes with the cam gear 27. As described above, the rotation of the output shaft 20 is transmitted to the cam gear 27 after being reduced by two stages of reducing gear pair including the reducing gear pair made up of the pinion 28 and the reducing gear 29 having a diameter larger than that of the pinion 28 and the reducing gear pair made up of the pinion 32 and the cam gear 27 having a diameter larger than that of the pinion 32.

Circular eccentric cams 33 and 34 are provided on both of inner and outer side surfaces of the cam gear 27 so as to be eccentric to the rotation center of the support shaft 26. Phases of the inner eccentric cam 33 and the outer eccentric cam 34 are shifted by about 180 degrees in the rotation direction of the cam gear 27. A coupling pin 35 is provided at a base end part of one blade 18 so as to project toward the inside of the casing 14, and a coupling pin 36 is provided at a base end part of the other blade 19 so as to project toward the outside. One end part of a cam rod 37 is swingably coupled to the coupling pin 35, and the eccentric cam 33 is rotatably fit in a fitting hole formed at the other end part of the cam rod 37. One end part of a cam rod 38 is swingably coupled to the coupling pin 36, and the eccentric cam 34 is rotatably fit in a fitting hole formed at the other end part of the cam rod 38. Therefore, when the output shaft 20 is driven to rotate, the rotational motion of the cam gear 27 is converted to the linear reciprocating motion of the blades 18 and 19 by the cam rods 37 and 38. Since phases of the centers of the eccentric cams 33 and 34 are shifted by about 180 degrees in a circumferential direction with respect to the center of the support shaft 26, when the cam gear 27 is driven to rotate, one of the paired two blades 18 and 19 is driven to move forward and the other thereof is driven to move backward. As described above, the blades 18 and 19 are linearly driven in mutually reverse directions, and trees are pruned by cutting parts provided on the respective blades 18 and 19.

As shown in FIG. 1, an operation display panel 41 is disposed on an upper surface of the casing 14 at a tip end part of the main handle 13. As shown in FIG. 2, the operation display panel 41 is provided on a front surface side of a holder 42, and the holder 42 is attached to the casing 14 by engaging convex parts 42a and 42b provided at front and rear end parts of the holder 42 with concave parts of the casing 14. As shown in FIG. 1, the operation display panel 41 has a driving information display unit 43 for displaying the driving information of the hedge clipper 10 and an operation switch unit 44. By operating the operation switch unit 44, a rotation speed of the electric motor 11 is set and specific driving information is selected from among a plurality of pieces of driving information displayed on the driving information display unit 43. The rotation speed of the electric motor 11 corresponding to the operating speed of the blades 18 and 19 and the remaining capacity of the battery are displayed as display contents of the driving information on the driving information display unit 43, and the driving information to be displayed on the driving information display unit 43 is switched and selected by the operation of the operation switch unit 44. As described above, the driving information display unit 43 is a display unit having a function of displaying both of the motor rotation speed and the battery remaining capacity.

The selection of which of the motor rotation speed and the battery remaining capacity is to be displayed as the contents of the driving information is identified by an operation status or an operation method of the operation switch unit 44. For example, when the operation switch unit 44 is held down for 1 second or longer, the battery remaining capacity is displayed on the driving information display unit 43 as the driving information. Meanwhile, when the time to hold down the operation switch unit 44 is 1 second or shorter, the operating speed is displayed as the driving information. Simultaneously, when the operation switch unit 44 is operated for a short time, the rotation rate of the electric motor 11 is raised up by one level. Note that the operation status to select the contents of the driving information is not limited to the case where the information to be displayed is selected in accordance with the operation time to hold down the operation switch unit 44, that is, the on-time, and the contents of the driving information may be selected by the number of operations. In that case, for example, the speed is displayed when the operation switch unit 44 is pressed once, and the battery remaining capacity is displayed when the operation switch unit 44 is pressed several times in a unit time.

The driving information display unit 43 has four light emitting parts 45a to 45d made up of LEDs. In the case where these light emitting parts 45a to 45d display the operating speed of the blades 18 and 19, that is, the motor rotation speed, the rotation speed is displayed in four levels by the number of light emitting parts 45a to 45d being lit on. For example, when all of the light emitting parts 45a to 45d are being lit on, it displays that the rotation speed is at the maximum, and when only one light emitting part 45a is being lit, it displays that the rotation speed is at the minimum. As the number of light emitting parts being lit on is increased, the higher rotation speed is displayed. On the other hand, with respect to the battery remaining capacity, for example, when two light emitting parts 45c and 45d are both being lit on, it displays that the battery capacity is fully charged, and when only one light emitting part 45d is being lit, it displays that the battery remaining capacity is running out. When the light emitting parts 45c and 45d are both not lit on, it displays that there is no remaining battery capacity. Alternatively, the remaining capacity can also be displayed in four levels, and the operating speed of the blade can also be displayed in arbitrary levels other than the four levels by changing the number of light emitting parts. Also, as the mode to display the battery remaining capacity, the mode in which the two light emitting parts 45c and 45d are blinked on and off can be adopted instead of the mode in which they are lit on. Inversely, the light emitting parts may be blinked on and off when the rotation speed is displayed and the light emitting parts may be lit on when the battery remaining capacity is displayed.

As described above, the operation switch unit 44 has a function of setting and inputting the rotation speed of the electric motor 11 and a function of switching the contents of the driving information displayed by lighting on the driving information display unit 43, and it doubles as both mechanisms. By providing one driving information display unit 43 and one operation switch unit 44 on the operation display panel 41 and giving a plurality of functions to each of the driving information display unit 43 and the operation switch unit 44, the size of the operation display panel 41 can be reduced without increasing the size of the driving information display unit 43 and the operation switch unit 44. When the size of the operation display panel is reduced, the manufacturing cost of the hedge clipper 10 can be reduced, and in addition, the driving information display unit 43 and the operation switch unit 44 can be made more visible and the operability of the operation switch unit 44 is enhanced. Furthermore, in the case where the driving information display unit 43 and the operation switch unit 44 of the present embodiment are provided in a space in which conventional individual display units and switch units are provided, the sizes thereof can be increased, so that the visibility and the operability thereof can be enhanced. Moreover, since the operation display panel 41 is provided at the front end part of the main handle 13 in the casing 14, it is possible to operate the operation switch unit 44 by one hand which is holding the main handle 13 without releasing the main handle 13, and the operability of the switch can be enhanced. In particular, since the front end part of the main handle 13 is inclined upward as it goes to the front side of the casing 14 and the operation display panel 41 is provided at the inclined part 14d, the operability of the switch and the visibility of the display unit are improved.

More specifically, the casing 14 has two top parts 14a and 14b which project most (are located at outermost positions) in the vertical direction (vertical direction in FIG. 2). One top part 14a corresponds to the most projecting position of the power source housing 12, and the other top part 14b corresponds to the most projecting position of a battery pack attachment part 14c to which the battery pack 23 is attached. The operation display panel 41 is provided at a position below a virtual line connecting the two top parts 14a and 14b. In the case where the battery pack 23 projects outward more than the top part 14b, the operation display panel 41 may be provided at the position below the virtual line connecting a top part of the battery pack 23 and the top part 14a of the power source housing 12. This structure can protect the operation display panel 41 from the external force. For example, when the hedge clipper 10 is placed upside down (flip vertical in FIG. 2), the top parts 14a and 14b make contact with a ground surface, so that the operation display panel 41 can be protected without being in contact with the ground surface.

Also, since the operation display panel 41 is provided on the front side (on the power source housing 12 side) of the casing 14 relative to the main handle 13, the operation display panel 41 is not hidden even when the worker holds the main handle 13, and the visibility can be enhanced. In particular, since the operation display panel 41 is directed to the main handle 13 side (that is, the worker side) by providing it on the inclined part 14d as described above, the visibility can be further enhanced. Also, since the inclined part 14d is a part of the casing 14 adjacent to the main handle 13 and the worker can operate the operation display panel 41 while holding the main handle 13, the operability can also be enhanced.

On the back surface of the holder 42, a board 46 is provided as shown in FIG. 2, and this board 46 is connected to a control circuit 47 by a cable. The control circuit 47 has a microprocessor and a memory, output signals from the trigger switch 24 and the operation switch unit 44 and output signals from various sensors provided in the hedge clipper 10 are transmitted to the microprocessor, and the microprocessor outputs a control signal to the electric motor 11 and the driving information display unit 43 based on the output signals.

Figure 3:
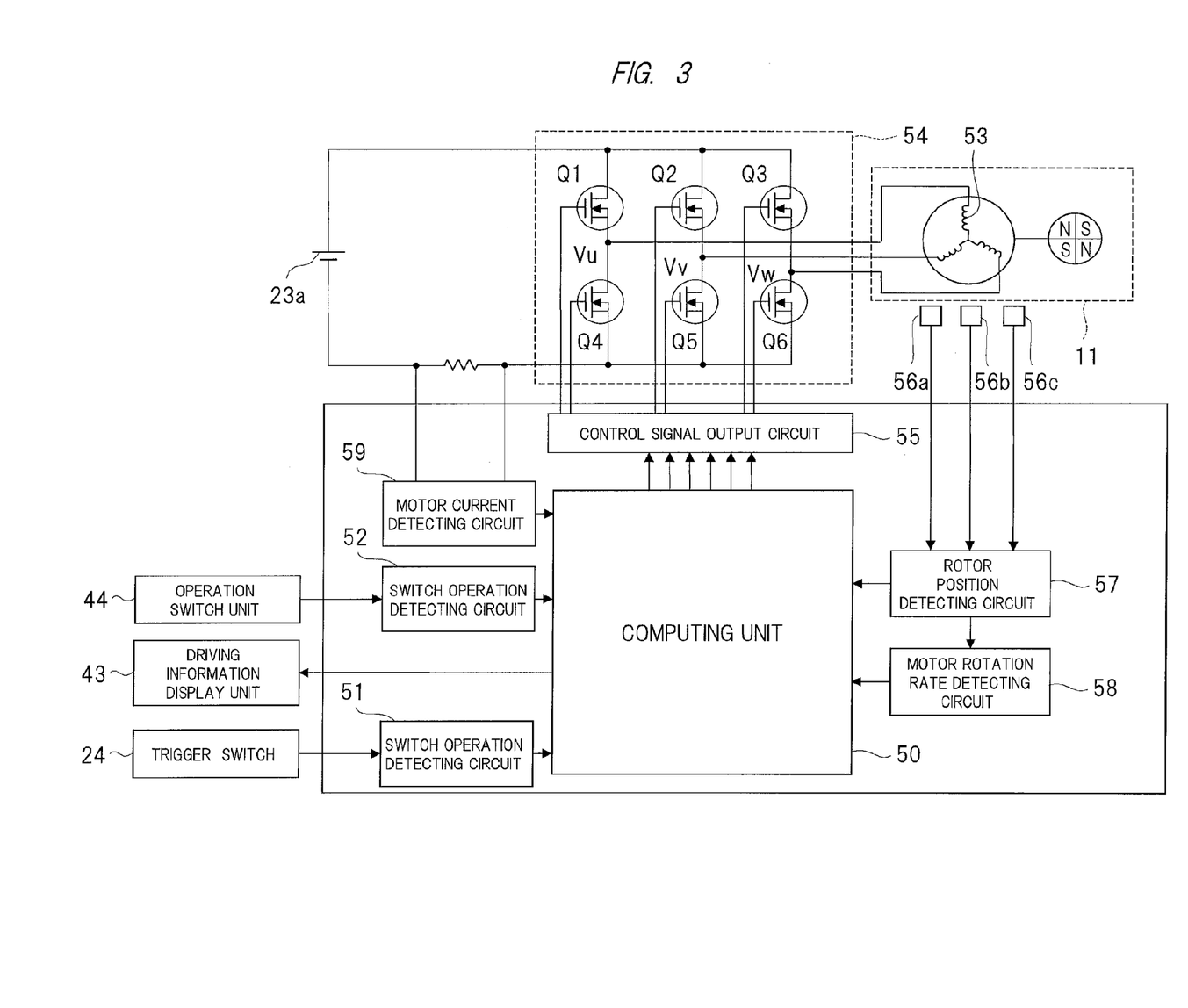
FIG. 3 is a block diagram of a control circuit of the hedge clipper shown in FIG. 1 and FIG. 2.

FIG. 3 is a block diagram of the control circuit 47 of a control unit of the hedge clipper 10. An output signal of the trigger switch 24 is input to a computing unit 50 composed of a microprocessor via a switch operation detecting circuit 51, and an output signal of the operation switch unit 44 is input to the computing unit 50 via a switch operation detecting circuit 52. The electric motor 11 is a three-phase brushless motor, and a direct current from a battery 23a contained in the battery pack 23 is converted to three-phase alternating currents of u phase, v phase and w phase by an inverter 54, and then supplied to a winding coil 53. The computing unit 50 outputs a PWM signal corresponding to a sine wave stored in a memory (not shown) in advance to a control signal output circuit 55 in accordance with a motor rotation speed set by a worker, and the control signal output circuit 55 outputs a driving signal to three pairs of switching elements (transistors or FETs) Q1 to Q6 of the inverter 54. The electric motor 11 is provided with three position sensors 56a to 56c made up of Hall elements or others at intervals of 120 degrees in order to detect the rotation of a rotor of the electric motor 11, and detection signals of the respective position sensors 56a to 56c are output to a rotor position detecting circuit 57. An output signal of the rotor position detecting circuit 57 is transmitted to the computing unit 50 and a motor rotation rate detecting circuit 58, and the computing unit 50 outputs a switching signal to transistors of the inverter 54 based on the signal from the rotor position detecting circuit 57. The motor rotation rate detecting circuit 58 outputs a feedback signal based on the motor rotation rate to the computing unit 50. A motor current detecting circuit 59 is provided on an output line of the battery 23a in order to detect a current supplied from the battery 23a to the winding coil 53 of the electric motor 11, and the rotation of the electric motor 11 is stopped when an excessive current flows to the electric motor 11.

Figure 4:
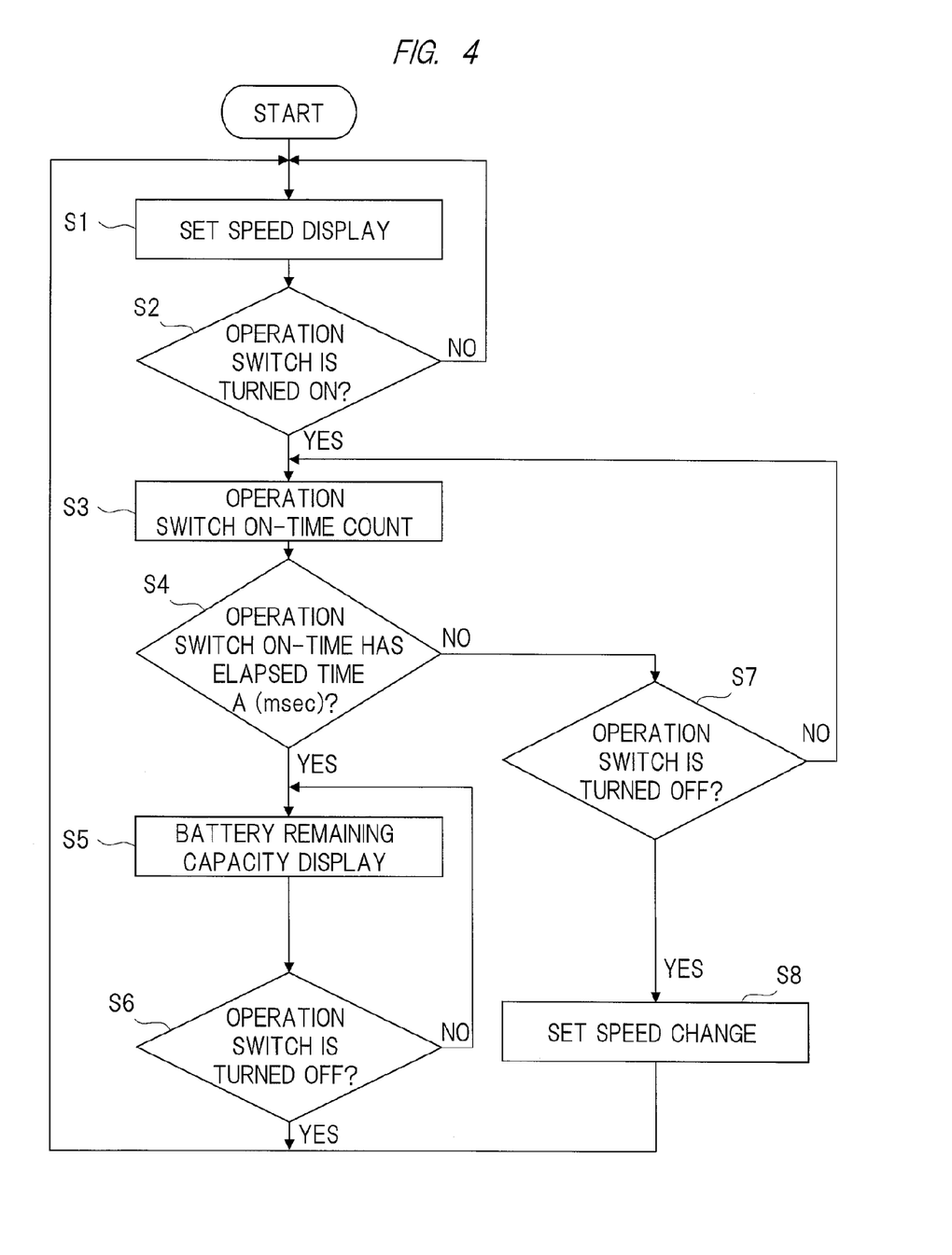
FIG. 4 is a flowchart of an algorithm of an operation display control of an operation display panel unit shown in FIG. 1.

FIG. 4 is a flowchart of an algorithm of an operation display control of an operation display panel unit. When a worker operates the trigger 25 to turn on the trigger switch 24, a set speed is displayed on the driving information display unit 43 and the rotation rate of the electric motor 11 is controlled so as to reach the displayed speed in a step S1. For example, in the case where the rotation speed of the electric motor 11 in the last use of the hedge clipper 10 is set to the lowest rotation rate, the electric motor 11 is set to the lowest rotation rate, and one of the four light emitting parts 45a to 45d of the driving information display unit 43 is lit on. This displays that the rotation rate of the electric motor 11 is the lowest rotation rate to the worker. When it is detected that the operation switch unit 44 is pressed to be turned on in a step S2, the on-time of the operation switch unit 44 is counted in a step S3. In a step S4, it is determined whether the on-time of the operation switch unit 44 has elapsed a predetermined set time A (msec), and when the on-time of the operation switch unit 44 has elapsed the predetermined set time A, the display of the driving information display unit 43 is switched to the display of the battery remaining capacity (step S5). About 500 msec is set as this set time A.

The display of the battery remaining capacity continues until the on-operation of the operation switch unit 44 is finished in a step S6, and when the operation switch unit 44 is turned off, the display is switched to the display of set speed of the step S1. On the other hand, when it is detected in a step S7 that the on-operation of the operation switch unit 44 is finished before elapsing the set time A in the step S4, the set speed of the electric motor 11 is raised up by one level and the raised speed is displayed by lighting on the driving information display unit 43 in a step S8. For example, when the set speed is changed by one level from that in the step S8 in the state where the rotation speed of the electric motor 11 is the lowest rotation speed, the electric motor 11 is driven at the set speed of the second level, and the two light emitting parts 45a and 45b are lit on to display that the electric motor 11 is driven at the set speed of the second level. When the set speed is changed by one level from that in the step S8 in the state where the electric motor 11 is rotated at the highest rotation speed, the rotation speed of the electric motor 11 is returned to the lowest speed. As described above, the driving information display unit 43 employs the set speed display mode to display the motor rotation speed as a basic mode, and the mode can be switched to the remaining capacity display mode to display the battery remaining capacity in accordance with the operation time of the operation switch unit 44.

In the driving information display unit 43 of the operation display panel 41 described above, the battery remaining capacity and the rotation speed of the electric motor 11 are displayed. In addition to these, one or both of the battery life and the life of the electric motor 11 may be displayed by lighting on the driving information display unit 43. Alternatively, it is also possible to display the life of the switching elements Q1 to Q6 constituting the inverter circuit 54 and a value of the current flowing in the inverter circuit 54 (electric motor 11). Furthermore, when a brush electric motor is used as a driving source, the life of the brush may be displayed, and the life of cutting parts of the blades 18 and 19 as the tip tool may be displayed.

FIG. 1 and FIG. 2 show the hedge clipper 10 as an example of a portable tool, but the portable tool to which the operation display panel 41 shown in FIG. 1 can be applied is not limited to the hedge clipper 10. The operation display panel 41 shown in FIG. 1 can be mounted on other portable tools such as a round saw, a driver, an impact driver, a hammer, a hammer drill, a jigsaw, a grinder, a blower and others as long as a power source is incorporated in a casing and the work is carried out while the portable tool is held by the hand of a worker.

The present invention is not limited to the embodiment described above and various modifications and alterations can be made within the scope of the invention. For example, the driving source of the portable tool is not limited to the electric motor described above, and the operation display panel 41 described above can be mounted also on the portable tool having an engine as the power source. In this case, the remaining amount in a fuel tank can be displayed by lighting or blinking as the driving information on the operation display panel 41. Alternatively, the present invention can be applied also to the tool using AC power source (commercial power source) as the power source. In this case, an input voltage from the commercial power source can be displayed by lighting or blinking as the driving information on the operation display panel 41. Also, the portable tool is not limited to a transportable tool, and the present invention can be applied also to a bench (stationary) tool such as a bench cutter.

What is claimed is:

1. A portable tool having a casing provided with a handle unit held by a worker and a power source housing which is located on a front side of the handle unit and houses a power source and a tip tool which is located on a front side relative to the power source housing and is driven by the power source, the portable tool comprising:
   an operation display panel unit provided with a driving information display unit which displays driving information including at least a set speed of the power source and a remaining capacity of a battery to supply power to an electric motor serving as the power source; and
   an operation switch unit which includes a single operation switch to select different driving information displayed on the driving information display unit,
   wherein the operation display panel unit is disposed at a recessed position below a virtual line, in a longitudinal cross-section, connecting top parts of the casing, and display of the driving information display unit is switched between the set speed of the power source and the remaining capacity of the battery by an operation of the single operation switch.

2. The portable tool according to claim 1,
   wherein the operation display panel unit is provided on an upper surface of the casing on a front side relative to the handle unit, and a worker can operate the operation switch unit while holding the handle unit.

3. The portable tool according to claim 2,
   wherein the casing has an inclined part which faces toward the handle unit and inclines upward as the inclined part goes from the handle unit to the power source housing, and
   the operation display panel unit is provided on the inclined part.

4. The portable tool according to claim 1,
   wherein when the display of the driving information display unit is switched from the set speed of the power source to the remaining capacity of the battery by an operation of the single operation switch, the display of the driving information display unit is returned to the set speed of the power source by turning off the operation of the single operation switch.

5. The portable tool according to claim 1,
   wherein setting of the set speed can be changed by the single operation switch, and
   either one of the switching of the display contents of the driving information displayed on the driving information display unit and the change of the setting of the set speed is selected and carried out in accordance with an operation status of the single operation switch.

6. A portable tool having a casing provided with a power source housing in which a power source is housed and a handle held by a worker, the portable tool comprising:
   an operation display panel unit provided with a driving information display unit which displays specific driving information in a plurality of pieces of driving information including at least a set speed of the power source and a remaining capacity of a battery to supply power to an electric motor serving as the power source; and
   an operation switch unit which includes a single operation switch to select specific driving information displayed on the driving information display unit from among the plurality of pieces of driving information,
   wherein display of the driving information display unit is switched between the set speed of the power source and the remaining capacity of the battery by an operation of the single operation switch.

7. The portable tool according to claim 6,
   wherein setting of the set speed can be changed by the operation switch unit, and
   either one of the switching of the display contents of the driving information to be displayed on the driving information display unit and the change of the setting of the set speed is selected and carried out in accordance with an operation status of the operation switch unit.

8. The portable tool according to claim 6,
   wherein length of time of operating the operation switch unit is employed as an operation status of the operation switch unit, and display of the driving information is switched by the operation switch unit based on the length of time of operating the operation switch unit.

9. The portable tool according to claim 6,
   wherein the number of operations of the operation switch unit is employed as an operation status of the operation switch unit, and display of the driving information is switched by the operation switch unit based on the number of operations.

10. The portable tool according to claim 6,
    wherein the driving information display unit displays a life of the battery.

11. The portable tool according to claim 6,
    wherein the driving information display unit displays a life of the electric motor.

12. The portable tool according to claim 6,
    wherein the driving information display unit has a plurality of light emitting parts, and display contents of the driving information to be displayed on the driving information display unit change depending on the number of light emitting parts whose lights are turned on.

13. The portable tool according to claim 6,
wherein when the display of the driving information display unit is switched from the set speed of the power source to the remaining capacity of the battery by an operation of the single operation switch, the display of the driving information display unit is returned to the set speed of the power source by turning off the operation of the single operation switch.

14. A portable tool having a casing provided with a power source housing in which a power source is housed and a handle held by a worker, the portable tool comprising:
  an operation display panel unit provided with a driving information display unit which displays specific driving information in a plurality of pieces of driving information including at least a set speed of the power source and a remaining capacity of a battery to supply power to an electric motor serving as the power source; and
  an operation switch unit which includes a single operation switch to select specific driving information displayed on the driving information display unit from among the plurality of pieces of driving information,
wherein display of the set speed of the power source and display of the remaining capacity of the battery are associated with different operation statuses of the operation switch unit, and display contents of the driving information to be displayed on the driving information display unit are switched in accordance with the different operation statuses of the operation switch unit.

15. The portable tool according to claim 14,
wherein setting of the set speed can be changed by the single operation switch, and
either one of the switching of the display contents of the driving information displayed on the driving information display unit and the change of the setting of the set speed is selected and carried out in accordance with an operation status of the single operation switch.

* * * * *